US012809438B2

(12) United States Patent
Krishnapura et al.

(10) Patent No.: US 12,809,438 B2
(45) Date of Patent: Nov. 24, 2026

(54) HYPERSCALE POWER CONTROL FOR IMPROVED DATACENTER UTILIZATION

(71) Applicant: Intel Corporation, Santa Clara, CA (US)

(72) Inventors: Sheshaprasad Krishnapura, Cupertino, CA (US); Vipul Lal, Santa Clara, CA (US); Prasad Pusuluri, Union City, CA (US); Harish Srinivasappa, Cupertino, CA (US); Yunhua Wu, San Jose, CA (US); Shaji Kootaal Achuthan, Danville, CA (US); Ty Tang, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/965,698

(22) Filed: Oct. 13, 2022

(65) Prior Publication Data

US 2024/0126355 A1 Apr. 18, 2024

(51) Int. Cl.
*G06F 1/28* (2006.01)
*G06F 1/3206* (2019.01)
*G06F 11/30* (2006.01)

(52) U.S. Cl.
CPC .............. *G06F 1/28* (2013.01); *G06F 1/3206* (2013.01); *G06F 11/3062* (2013.01)

(58) Field of Classification Search
CPC ..... G06F 1/28; G06F 1/30; G06F 1/32; G06F 1/3206; G06F 11/3058; G06F 11/3062; G06F 1/189; G06F 1/26; H05K 7/1492
See application file for complete search history.

(56) References Cited

U.S. PATENT DOCUMENTS

| | | | | |
|---|---|---|---|---|
| 5,752,046 | A * | 5/1998 | Oprescu | G06F 1/305 713/340 |
| 9,182,795 | B1 * | 11/2015 | Hill | H04B 3/54 |
| 9,891,682 | B1 * | 2/2018 | Czamara | G06F 1/266 |
| 9,914,548 | B1 * | 3/2018 | Vadillo | H02J 1/14 |
| 10,509,456 | B2 | 12/2019 | Lin et al. | |
| 10,599,204 | B1 | 3/2020 | Ross et al. | |
| 11,733,762 | B2 | 8/2023 | Wolford et al. | |

(Continued)

OTHER PUBLICATIONS

Tosi, Alessandra. "How Active Learning Can Train Machine Learning Models with Less Data". Mind Foundry. Online Oct. 9, 2018. Retrieved from Internet Nov. 13, 2025. <https://www.mindfoundry.ai/blog/how-active-learning-can-help-you-train-models-with-less-data>. (Year: 2018).*

(Continued)

*Primary Examiner* — Thomas J. Cleary
(74) *Attorney, Agent, or Firm* — Compass IP Law PC

(57) ABSTRACT

A server system can have an electrical hierarchy that includes a transformer level, a bus segment level, a power distribution unit (PDU) level, and a server device level. The different levels can have nominal safety levels of power draw that are lower than the actual maximum power draw capability. Based on monitoring power draw at multiple levels of the electrical hierarchy, a power manager can determine that it is permissible for a server device, a group of server devices, or a portion of the electrical hierarchy to exceed the nominal safety level of power draw.

19 Claims, 7 Drawing Sheets

(56) References Cited

U.S. PATENT DOCUMENTS

| | | | | |
|---|---|---|---|---|
| 2009/0119523 | A1* | 5/2009 | Totten | G06F 1/32 713/320 |
| 2010/0211810 | A1* | 8/2010 | Zacho | G06F 1/3203 713/320 |
| 2012/0017102 | A1* | 1/2012 | Turicchi, Jr. | G06Q 10/06 713/300 |
| 2015/0177814 | A1* | 6/2015 | Bailey | G06F 1/3296 713/320 |
| 2021/0356924 | A1* | 11/2021 | Donnig | H02J 1/14 |
| 2021/0397239 | A1* | 12/2021 | Sethi | G06F 1/3206 |
| 2022/0147129 | A1* | 5/2022 | Cheng | G06F 1/3206 |
| 2023/0189469 | A1* | 6/2023 | Mukherjee | G06F 1/189 713/320 |
| 2023/0229216 | A1* | 7/2023 | Lerer | G06F 1/3203 713/300 |

OTHER PUBLICATIONS

Wu, Qiang, et al., "Dynamo: Facebook's Data Center-Wide Power Management System", 2016 ACM/IEEE 43rd Annual International Symposium on Computer Architecture, Jun. 18, 2016 to Jun. 22, 2016, 12 pages.

* cited by examiner

HYPERSCALE POWER CONTROL FOR IMPROVED DATACENTER UTILIZATION

FIELD

Descriptions are generally related to network computing, and more particular descriptions are related to power management.

BACKGROUND

The physical implementation of a datacenter includes a building or portion of a building with computing equipment such as servers and network devices. The datacenter physical structure includes power delivery and cooling for the computing equipment. The power consumption of the servers varies significantly depending on the type of workload running on the servers. Measurements of datacenter implementations have detected a 10-50% power difference between peak power consumption and average power consumption of the servers.

Datacenter operators size the datacenter infrastructure and server installation pattern based on either peak power consumption or a set utilization limit. Peak power consumption is based on the assumption that every piece of equipment is at maximum utilization, which draws the most power. In reality, not all equipment is fully utilized at all times, which means basing infrastructure on peak performance leads to overbuilding the datacenter in terms of power delivery and cooling capacity.

Set utilization accounts for the fact that peak power consumption does not occur at all times, and thus, the provisioning of infrastructure is based on an empirical value between the average consumption and peak power consumption. However, peak loading under heavy system utilization leads to outages when workload behavior changes and the servers start drawing more power than the empirical value.

To avoid outages, systems utilize guard bands to limit how much power any given server can draw, to avoid overloading the electrical capacity. Some systems shut down servers proactively when electrical utilization in the system gets high. Some systems implement power caps to limit peak capacity draw.

Making an assumption that all servers will utilize maximum capacity results in overprovisioning datacenter infrastructure, which results in underutilization of the datacenter. While guard bands and caps can allow utilization higher than average power consumption, ultimately they also result in underutilization of the infrastructure build for the datacenter.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

Descriptions of certain details and implementations follow, including non-limiting descriptions of the figures, which may depict some or all examples, and well as other potential implementations.

DETAILED DESCRIPTION

As described herein, a power manager can manage power based on power data from multiple or all levels of an electrical hierarchy of a datacenter or other system. The datacenter is a server system that can have an electrical hierarchy that includes a transformer level, a bus segment level, a power distribution unit (PDU) level, and a server device level. The different levels of the electrical hierarchy represent different levels of power distribution in a system infrastructure. The system can have sensors to monitor power data for each level.

The different levels can have nominal levels of power draw set based on average power consumption or a set level between average power consumption and peak power consumption. The nominal level is lower than the maximum power draw capability, which is the peak power consumption. Based on monitoring power draw at multiple levels of the electrical hierarchy, the power manager can determine that it is permissible for a server device, a group of server devices, or a portion of the electrical hierarchy to temporarily exceed the nominal level of power draw. The power manager can monitor power draw to selectively apply and remove power caps for portions of the electrical hierarchy.

Monitoring the power draw at multiple levels of the electrical hierarchy can enable deploying more servers than by using guard bands and power caps alone. Deploying more servers enables higher utilization of the system infrastructure. The power manager can provide the higher utilization without needing to shut servers down due to excess power loading.

By monitoring the specifics of the power draw for different electrical paths through the electrical hierarchy, the power manager can account for more specific effects of power usage in the datacenter. Thus, the power manager can enable more precise control over selective application of power caps, both in applying them and in removing them.

The finer tuning of the power consumption enables the power manager to more intelligently monitor the collective power usage in the datacenter. Thus, the power manager has more information to determine if an individual server, and individual PDU, a specific bus segment, or a combination of these can temporarily exceed a nominal limit without exceeding the maximum thresholds. The monitoring at different levels of the electrical hierarchy can be applied in conjunction with guard bands, power caps (e.g., nominal power limits), or other techniques to manage power usage.

Figure 1:
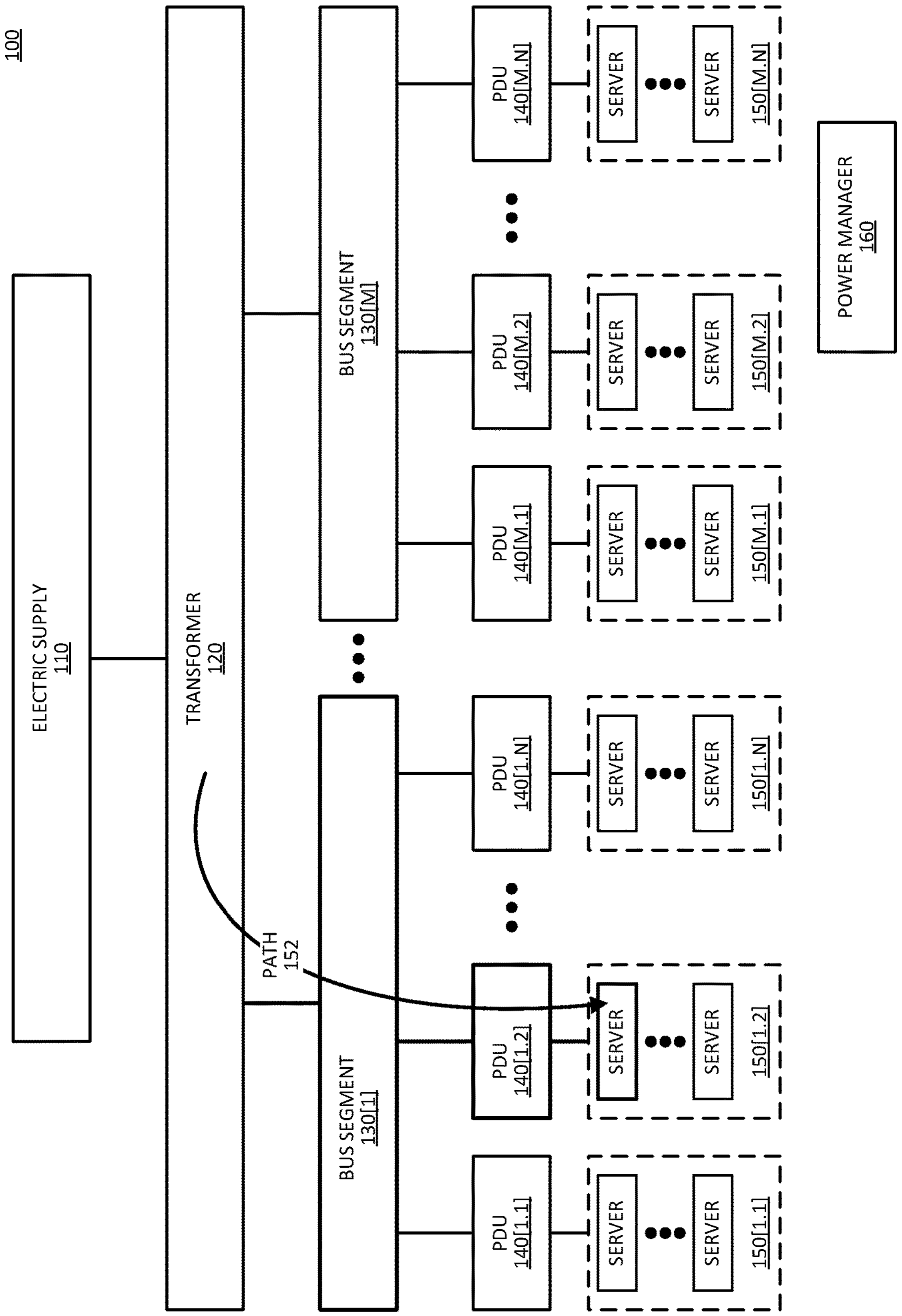
FIG. 1 is a block diagram of an example of an electrical hierarchy.

FIG. 1 is a block diagram of an example of an electrical hierarchy. System 100 represents a server system with an electrical hierarchy to provide power to servers. In one example, system 100 is a datacenter. The electrical hierarchy includes the transformer/substation to the busbar to the PDU, to the power supply unit (PSU) of the individual servers. System 100 does not specifically illustrate the PSUs.

System 100 illustrates how power is connected to the servers. At the grid interconnect level, system 100 represents electric supply 110 as the connection by the grid to the system. At the transformer level, system 100 illustrates transformer 120, which can be a transformer or substation. A datacenter can have its own substation as part of the infrastructure to connect to the grid.

Below the transformer is the bus level, which can have multiple bus segments, represented by bus segment 130[1], . . . , bus segment 130[M], collectively bus segments 130. Each of the M bus segments can be referred to as busbar connections. In one example, a bus segment distributes power to multiple server racks.

Multiple power distribution units (PDUs) can be connected to each of bus segments 130. System 100 represents PDU 140[1.1], PDU[1.2], PDU[1.N] coupled to bus segment 130[1] and PDU 140[M.1], PDU[M.2], PDU[M.N] coupled to bus segment 130[M]. In one example, each PDU is associated with an individual rack. A rack can include multiple servers. System 100 represents multiple servers 150[1.1] coupled to PDU 140[1.1], multiple servers 150[1.2] coupled to PDU 140[1.2], . . . , and multiple servers 150[1.N] coupled to PDU 140[1.N]. Similarly, system 100 represents multiple servers 150[M.1] coupled to PDU 140 [M.1], multiple servers 150[M.2] coupled to PDU 140[M.2], . . . , and multiple servers 150[M.N] coupled to PDU 140[M.N]. System 100 can have the same number of servers connected to each PDU. System 100 can alternatively have one or more PDUs having a different number of servers.

In some systems, power management is performed through the level of the individual server nodes. In some systems, power management is performed through the level of the rack, such as PDUs 140. In either case, the system can apply caps to the server/PDU based on monitoring the individual server/PDU. By looking at power draw by the servers, the PDUs, and the bus segments, system 100 can allow an individual server/PDU to exceed limits that would otherwise be applied. System 100 can look at a higher level than an individual server/PDU to adapt individual limits based on overall capacity and limits.

Power manager 160 represents a power management controller of system 100 to monitor power data and compute operations for power management based on the power data. In one example, power manager 160 is one of servers 150. In one example, power manager 160 is a standalone server device. In one example, power manager 160 is a computing device in a separate physical premises.

An application of a system in accordance with system 100 has been able to extend to 150% of limits as opposed to reducing to 85% of limits. Thus, system 100 can extend an individual electrical path to 150% while keeping the overall system within 100% of maximum thresholds. In one example, extending the power use beyond the nominal limit refers to extending the power use temporarily. In one example, extending the power use beyond the nominal limit refers to allowing one electrical path to be maxed out while limiting other paths to maintain the overall power draw within physical limits.

In one example, a datacenter has a green energy option or a green energy requirement. The techniques described with respect to system 100 and to the other systems described can apply to maximum power settings based on system architecture, and can apply to set power settings. For example, a system can have a power level associated with green energy use (e.g., a green energy goal) as well as a power level associated with architectural designs. The system can apply the techniques of monitoring system-wide power and selectively applying throttling to stay with a power level associated with green energy use. Thus, the system can maximize server usage within a green energy power level. For power consumption above the green energy level, the system can apply the techniques to maximize server usage within system design levels.

Path 152 represents an example of an electrical path through the electrical hierarchy. Path 152 is from transformer 120, through bus segment 130[1], through PDU 140[1.2], to a specific server. It will be understood that a different server in system 100 will have a different electrical path. In managing power distribution, all servers 150[1.2] could be treated under path 152. Servers 150[1.1] will have a different electrical path, going through the same bus segment, but through a different PDU. Servers 150[M.1] will have a different electrical path, going through a different bus segment and through a different PDU. System 100 can evaluate the power level of path 152, with power manager 160, in light of power data for different electrical paths in system 100.

Consider a scenario where system 100 has an initial server capacity and tries to determine if system 100 can support increased server capacity. In one example, power manager 160 determines the power draw through the electrical hierarchy and computes whether additional power can be drawn in the system. In one example, power manager 160 selects a representative group of servers 150 to determine their power usage to model whether the system can support additional servers. For example, power manager 160 could observe the power consumption of servers 150[M−2] for a period of time. Alternatively, power manager 160 could observe power consumption of servers 150[1-N] and servers 150[M−2] for a period of time.

Consider further that power manager 160 determines that additional servers can be added to system 100. The servers could be spread through the system where there is identified power capacity. Perhaps bus segment 130[M] initially supported PDU 140[M.1] through PDU 140[(M.N)−1] with servers 150[M.1] through servers 150[(M.N)−1], and power manager 160 determined that bus segment 130[M] could support an additional rack of servers. Power manager 160 can indicate the additional capacity to a system operator, who could then provision servers 150[M.N] based on computations based on the power information for system 100. The descriptions below include more detail regarding power management and increasing server capacity.

Simply observing power draw at individual servers or individual PDUs would not enable a system operator to identify the possibility of the additional capacity. By observing power data for the system as a whole, power manager 160 provides additional power management capabilities for system 100. The additional power management capabilities can include determining that additional capacity can be added, more precise determinations of when to apply a throttle/power cap, and more precise determinations of when to remove a throttle/power cap. Power manager 160 can allow one or more servers to temporarily exceed a nominal power limit, or exceed the nominal power limit for an extended time. The throttle/power cap can reduce the amount of cooling needed for the server, which can further reduce power use. In one example, the system factors reduction in cooling into the affect throttling has on power usage. In one example, the system separately factors the power reduction of a reduction in cooling and the power reduction of throttling.

Figure 2:
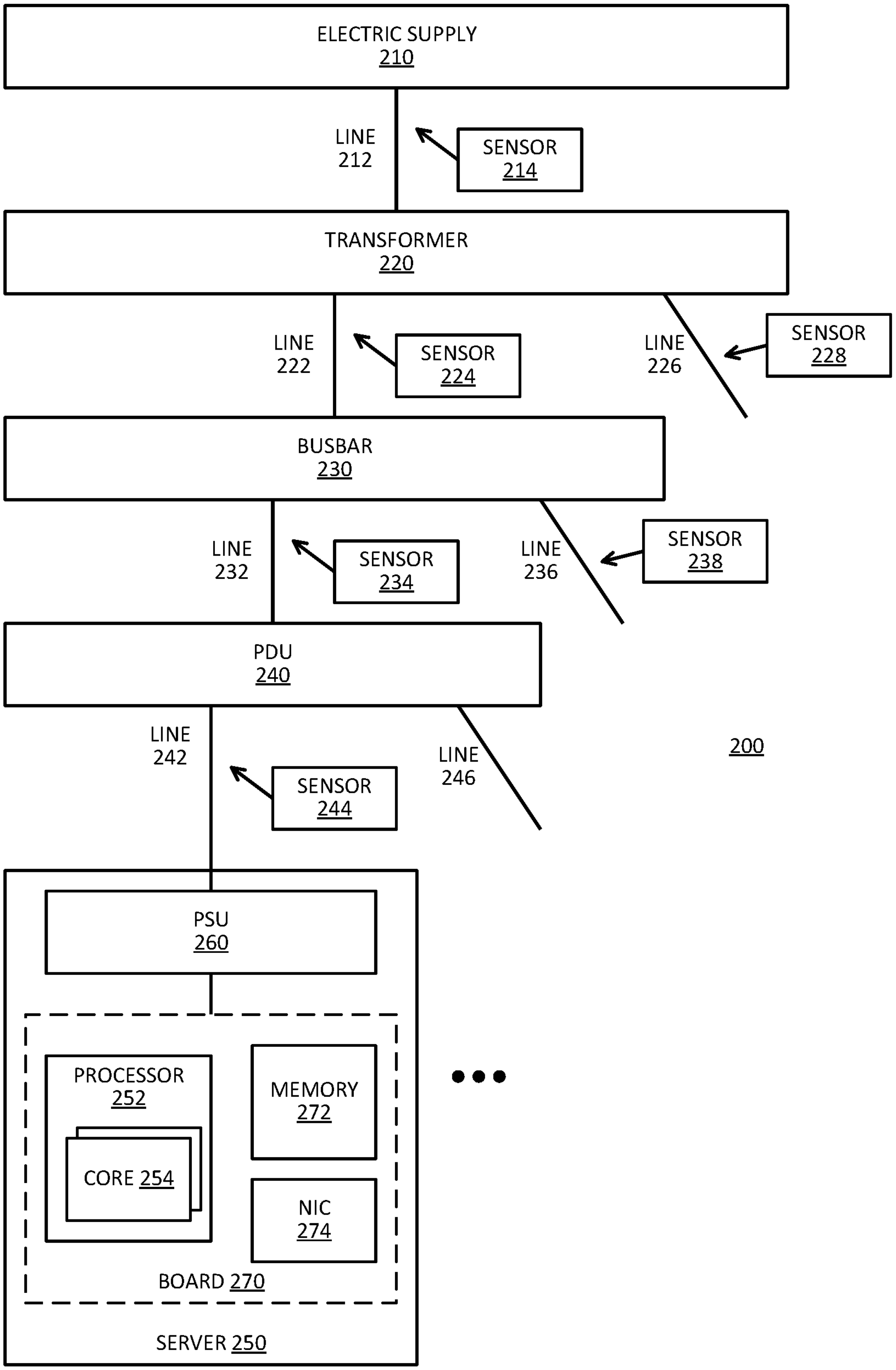
FIG. 2 is a block diagram of an example of an electrical hierarchy monitored at each level by a power manager.

FIG. 2 is a block diagram of an example of an electrical hierarchy monitored at each level by a power manager. System 200 represents a system in accordance with an example of system 100. System 200 illustrates sensors at the different levels of the electrical hierarchy.

System 200 illustrates electric supply 210 with line 212 representing the electrical distribution connection to transformer 220. Sensor 214 collects power data for line 212, and more specifically, data about power draw through line 212 by transformer 220.

Transformer 220 represents a supply for the server system. Line 222 represents one leg of the electrical distribution from transformer 220. Sensor 224 represents a sensor to measure the power through line 222. Line 226 represents a separate leg of electrical distribution from transformer 220. Sensor 228 can measure the power through line 226. Thus, there can be multiple lines from the transformer to multiple busbar connections.

Busbar 230 represents one of multiple bus segments connected to transformer 220. Busbar 230 can distribute power to multiple PDUs. PDU 240 represents one of the multiple PDUs electrically connected to busbar 230. Line 232 represents an electrical line from busbar 230 to PDU 240. Sensor 234 can measure the power drawn by PDU 240 and everything downstream from the PDU. Thus, line 232 represents one leg of power distribution from busbar 230 to PDU 240. Line 236 represents another leg of power distribution from busbar 230 to another PDU. Sensor 238 can measure the power through line 236.

Server 250 represents a server device that receives electrical power from PDU 240, through line 242. Line 246 represents an electrical connection to another server. Sensor 244 represents equipment to measure the power provided through line 242. In one example, PDU 240 includes electrical measure sensors for each line to each server. In one example, each server includes electrical measurement equipment to monitor power draw.

In one example, the various sensors illustrated in system 200 represent electrical meters or electrical measurement equipment known in the art. Thus, system 200 can leverage existing electrical metering/measuring to provide information for a power manager (not specifically illustrated in system 200). The sensors send their data to the power manager or store their data in a storage accessible by the power manager. In one example, one or more of the sensors in system 200 represent sensors modified with respect to know implementations, being modified to enable the sensors to provide their power data to the data manager.

Server 250 includes board 270, which represents the hardware platform that holds the server hardware. The hardware can include processor 252 and memory 272. Processor 252 executes software applications to perform the work of the server. Cores 254 represent the one or more processing cores of processor 252. Memory 272 represents storage for code and data to be used by processor 252 for execution of workloads. Board 270 also includes a network interface circuit (NIC) 274 to enable network communication to enable server 250 to exchange information with other servers and with devices external to server 250.

Server 250 can include power supply unit (PSU) 260 to provide power to the server device. In one example, PSU 260 can be considered part of the electrical hierarchy. PSU 260 can be considered part of server 250. PSU 260 can be considered separate from server 250. PSU 260 can be uniquely associated with server 250; thus, power draw by PSU 260 is the power draw for server 250. In one example, PSU 260 can provide power to multiple server devices.

System 200 correlate the data from various sensors to determine how power is distributed in the system. In one example, the sensors continuously measure power, and the power manager can access realtime power data. Realtime power data will be understood to refer to data that is collected continuously, subject to the sample rate of the measurement device. There may be a sample rate for storage of data measured.

Figure 3:
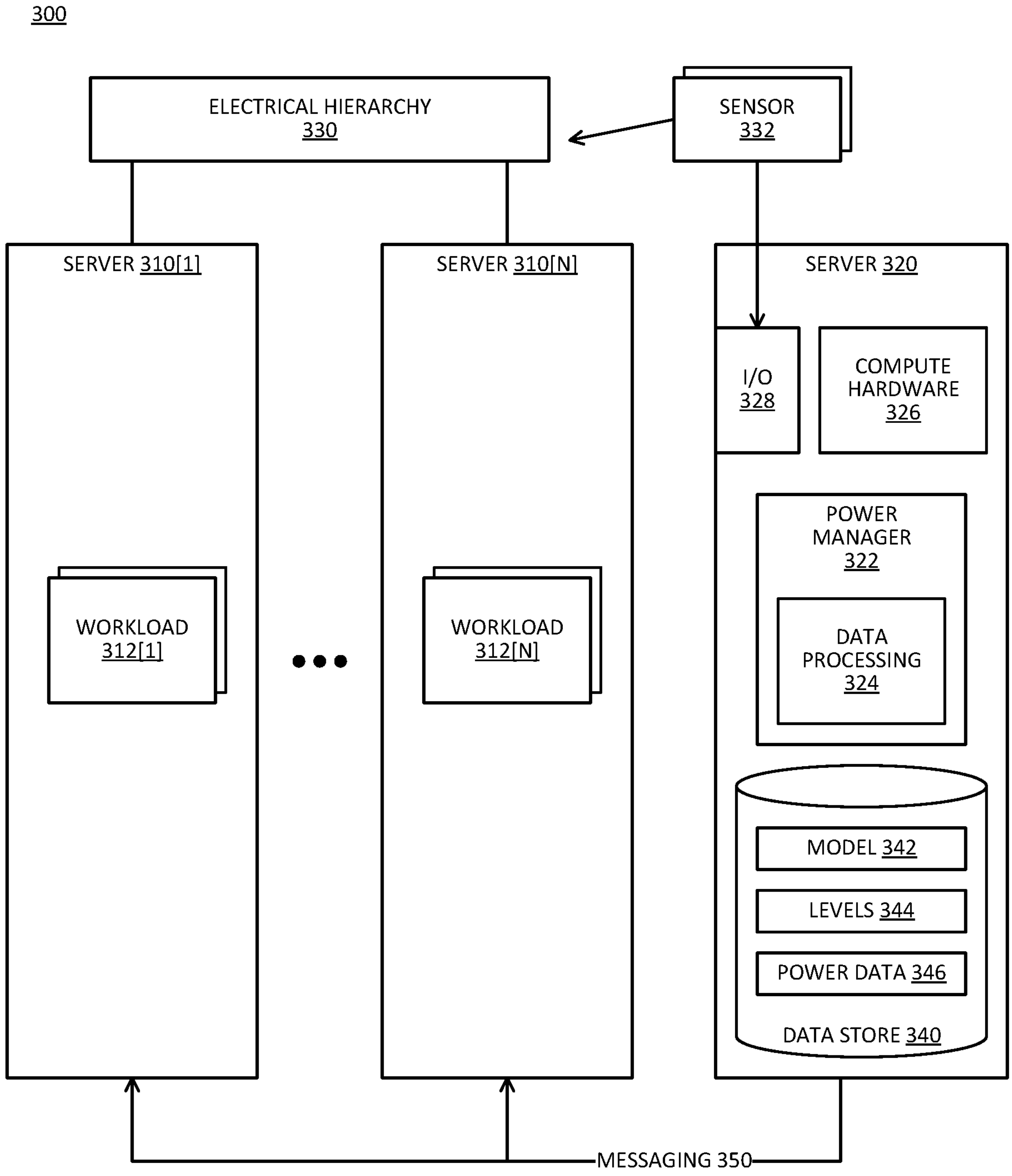
FIG. 3 is a block diagram of an example of a system with a power manager to monitor power draw of an electrical hierarchy.

FIG. 3 is a block diagram of an example of a system with a power manager to monitor power draw of an electrical hierarchy. System 300 represents a system in accordance with an example of system 100 or an example of system 200. System 300 specifically illustrates a power manager to perform power management in a server system.

System 300 includes N servers, server 310[1], . . . , 310[N], collectively servers 310. Servers 310 can represent a portion of a server system or the whole server system. Servers 310 execute workloads, which represents the computational operation of the servers. Server 310[1], . . . server 310[N] execute one or more workloads 312[1], . . . , workloads 312[N], respectively, collectively workloads 312.

System 300 illustrates server 320, which represents hardware to execute a power manager in accordance with any example provided herein. In one example, server 320 is one of servers 310. In one example, server 320 is a server provisioned from among the servers of the datacenter/system that it monitors. In one example, server 320 is part of a different server system. In one example, server 320 is a device separate from a server system, such as a standalone server device. Server 320 can be co-located with servers 310 or can be located in an area/building that has a different electrical supply.

Electrical hierarchy 330 represents an electrical hierarchy in accordance with what is described above. Electrical hierarchy 330 includes multiple levels of power distribution. Electrical hierarchy 330 provides power to servers 310. Sensors 332 represent sensors to monitor the power through electrical hierarchy 330. Sensors 332 provide power data to server 320 for power manager 322.

Server 320 includes compute hardware 326, which represents the hardware resources that enable server 320 to execute code and data. Server 320 includes input/output (I/O) 328, which represents hardware to enable server 320 to interface with external devices. In one example, I/O 328 is or includes a network interface. Sensors 332 generate power data and provide it to I/O 328 for power manager 322 to use. In one example, sensors 332 generate power data and store it in network storage (not specifically shown), and power manager 322 accesses the data through I/O 328.

Power manager 322 represents an execution environment of server 320 to monitor and manage power consumption through electrical hierarchy 330 to servers 310. Data processing 324 represents the execution of power management computations and calculations by power manager 322.

Data processing 324 enables power manager 322 to process power draw information from sensors 332. Data processing 324 can further compute a system topology and determine, based on power draw in the electrical hierarchy, whether to permit one or more servers draw more power than the nominal power limit, to require one or more servers to reduce power draw, or to permit one or more servers to remove a power reduction.

Data store 340 represents data for use by power manager 322. In one example, data store 340 is a local data storage resource, included in server 320. In one example, data store 340 is a network data storage resource, accessible to server 320 via I/O 328. In one example, data store 340 represents a combination of network storage and local storage.

In one example, power manager 322 represents an application or a software environment executed on server 320 by compute hardware 326. Power manager 322 can include machine learning/artificial intelligence algorithms to learn power patterns based on sensor data. In one example, power manager 322 can generate a model, such as a software model/object model to represent servers 310 and electrical hierarchy 330. The model can include a representation of the network topology, a representation of electrical hierarchy 330, parameters for different components to indicate maximum power ratings, nominal power limits, average power consumption, and other parameters.

Data store 340 can include one or more models 342 generated by power manager 322. Models 342 can represent models generated by a different system and executed/modified by power manager 322 for runtime power management of system 300. Data store 340 can include levels 344, which represent the maximum power ratings, set high power limits/levels, set low power limits/levels, calculated average power levels, or other levels, or a combination.

Power data 346 of data store 340 represents the power data based on what is measured by sensors 332. In one example, power data 346 is the actual values read by sensors 332. In one example, power data 346 is processed sensor readings, prepared for use by power manager 322 in power management operations.

In one example, power manager 322 correlates power data 346 with model 342 and levels 344 to determine how power consumption occurs in system 300. In one example, power manager 322 trains model 342 based on monitoring power data 346. The training can set power levels for various components within system 300, based on historical data. In one example, power manager 322 continually updates model 342 based on the monitoring by sensors 332.

Messaging 350 represent communication from server 320 to servers 310 related to power management. In one example, messaging 350 comes through I/O 328 to corresponding I/O hardware of servers 310. In one example, messaging 350 represents throttling of a server based on power monitoring. In one example, messaging 350 represents removal of a throttle of a server based on power monitoring.

The power consumption of servers 310 can vary significantly depending on the type of workload running on the servers. An implementation of an example of system 300 has been observed to have a 10-50% power difference between peak power consumption and average power consumption of the servers. The use of power manager 322 enables system 300 to utilize a higher percentage of the available infrastructure without violating the power limits.

With system 300, based on monitored data, power manager 322 can determine if any power unit (e.g., transformer, bulbar, PDU, PSU) within the electrical hierarchy can be allowed to get to its maximum limit or close to its maximum limit based on available power further up the hierarchy from the power path that feeds the power unit. Power manager 322 can also check to determine if any power unit is too close to its maximum limit and introduce a throttle to reduce power draw based on increased use on other power paths that branch from the same power unit higher up the hierarchy. Power manager 322 can continue to monitor power consumption and remove a throttle when power demand returns to a lower level. Thus, the system can approach power management from the top down as well as from the bottom up, instead of simply trying to keep one power unit within a set limit.

In one example, system 300 can aggregate telemetry from different domains, including: hyperscale datacenter facilities, high performance computing (HPC) application workload sensitivity to server operating frequency, and server node (which can include storage node and network node) operating performance, power, and temperature. Based on the aggregation of telemetry, power manager 322 can determine from its model and the current load/stress on the power distribution, whether to permit servers to exceed set points, whether throttle servers from normal operating limits (permissible limits), whether to remove a throttle from a server, or other operation. In response to a PSU, PDU, or other portion of the electrical hierarchy drawing power above a permissible power level, the power manager can perform a power draw assessment for the hierarchy. In one example, the power manager can adjust permissible power levels based on the assessment of power consumption in the hierarchy.

In one example, based on the power data, power manager 322 can determine if any of the power thresholds or permissible power limits that are set for the system are likely to be breached. If any permissible power limit is determined to be likely crossed, power manager 322 can intelligently reduce power consumption on the minimum required set of servers. In one example, messaging 350 can include requests to disable/enable turbo operation in a server, requests to apply power-state (P-state) controls until a power stress condition has passed, permission to remove power-state controls, or other messaging.

Figures 1, 4:
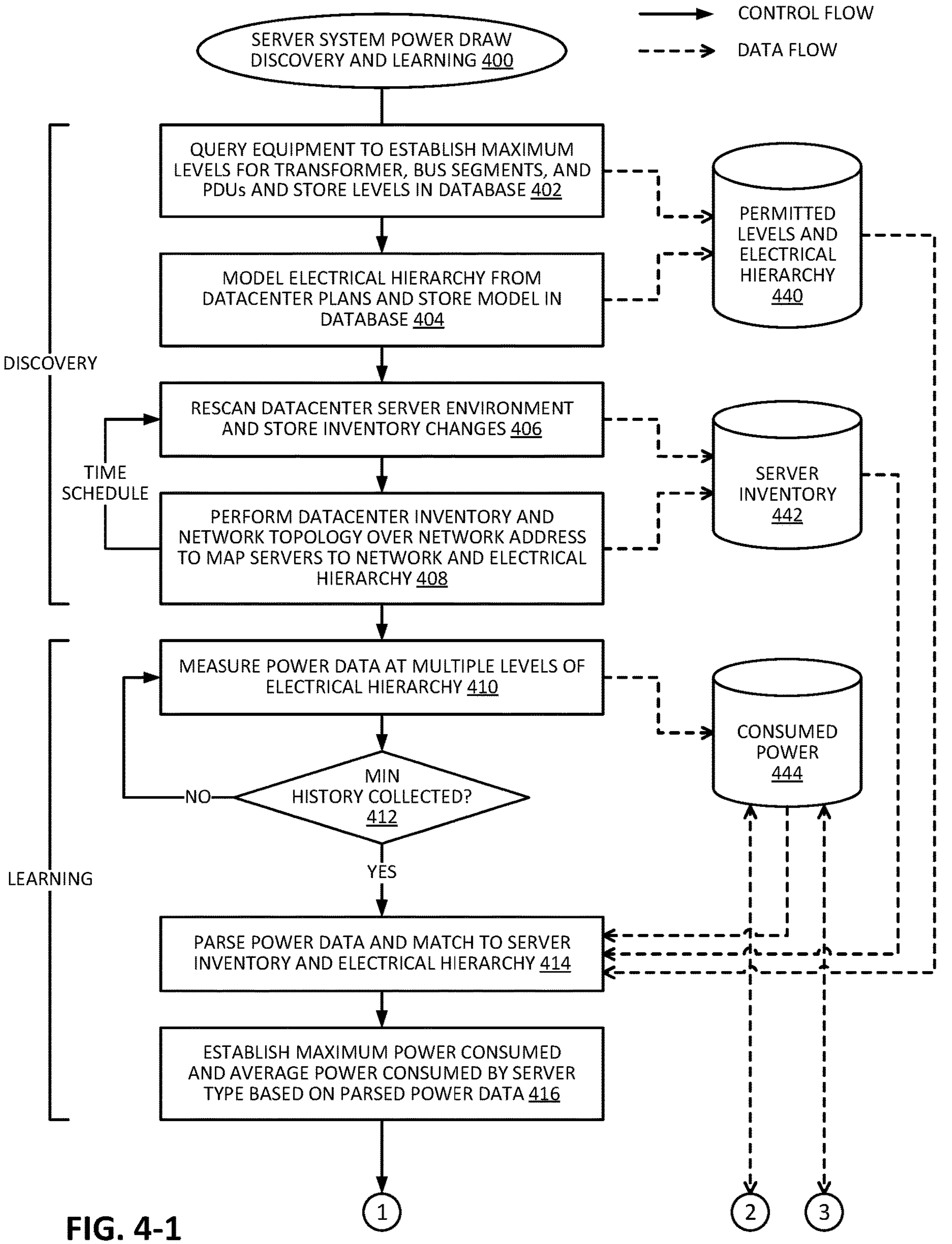
FIG. 4 is a flow diagram of an example of a process for monitoring power draw of an electrical hierarchy.
Figures 2, 4:
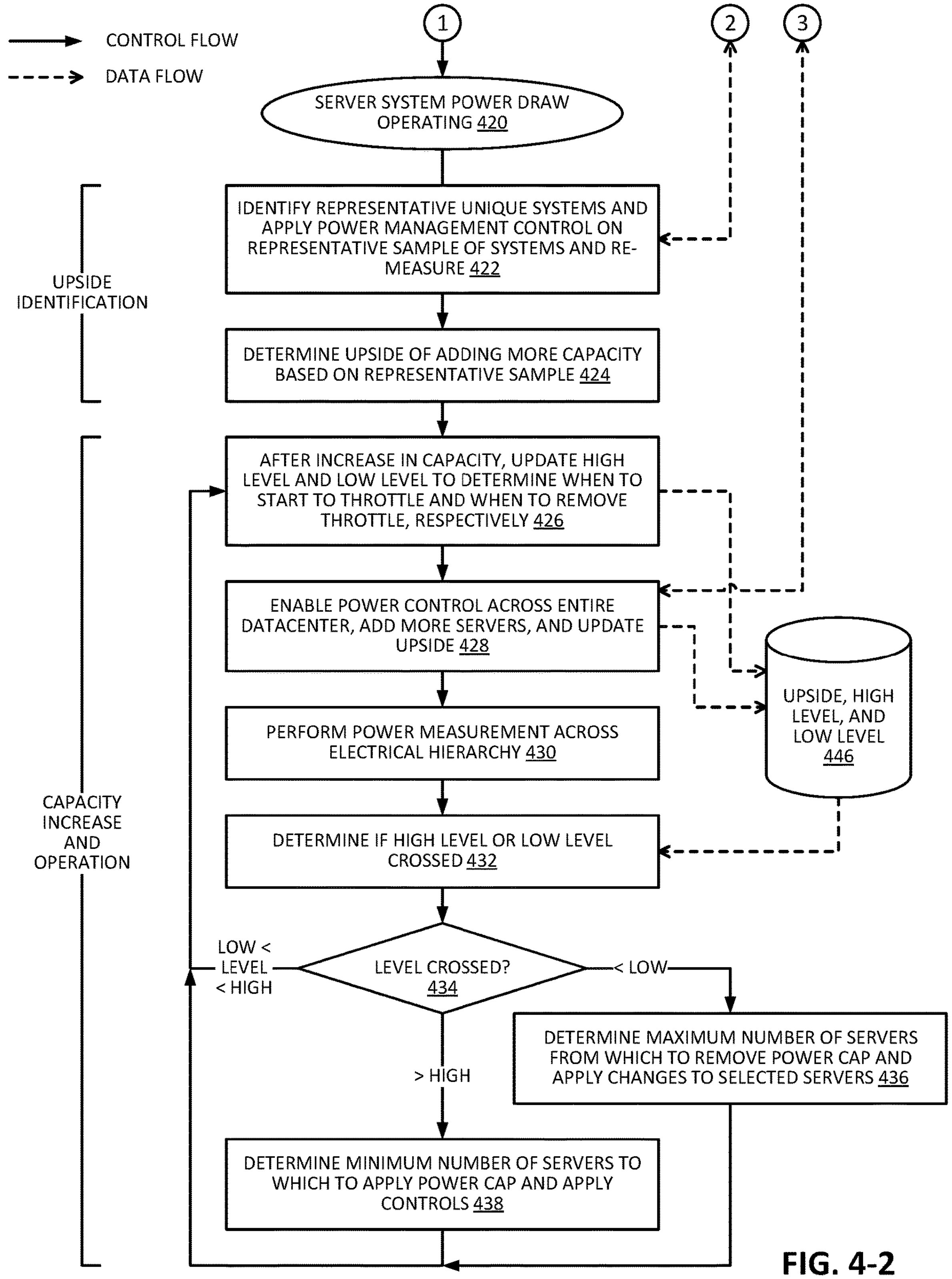

FIG. 4 is a flow diagram of an example of a process for monitoring power draw of an electrical hierarchy. The flow is split into FIG. 4-1 and FIG. 4-2, both for purposes of space constraints, as well as for logical purposes. Process 400 represents a process for discovery and learning related to power consumption in a server system. Processor 420 represents a processor for operation of the server system with power consumption monitoring and management. In the diagrams, the control flow is represented by the solid lines, while the data flow is represented by the dashed lines. The power management described can be referred to as hyperscale power control.

The control flow represents operation by a power manager. In one example, the operations of the power manager can be grouped as four primary phases: discovery and setup phase, learning phase, upside identification phase, and capacity increase and operation phase. The phases are presented for purposes of organizing information, and are not limiting.

In one example, the power manager queries equipment in the datacenter to establish maximum and permissible levels for the electrical hierarchy, including the transformer, bus segments, and PDUs, at 402. In one example, the power manager also sets maximum levels for PSUs. The power manager can store the power levels in a database, at 402. The power manager can perform queries over supported protocols, such as simple network management protocol (SNMP), Modbus, or some other protocol.

In one example, the power manager discovers network topology and server inventory through queries/scans to detect individual server devices. In one example, the network topology and server inventory are prepared separately and provided to the data manager. The power manager can model the electrical hierarchy from datacenter plans and store the model in the database, at 404.

Datastore 440 represents the permitted levels (permissible power levels) and electrical hierarchy information for use by the power manager. The storing in the database from 402 and 404 can populate the data in datastore 440.

In one example, the power manager rescans the system for changes to electrical hierarchy, network topology, and server inventory. The power manager can rescan the datacenter server environment and store inventory changes, at 406. The power manager can update server inventory information in datastore 442. In one example, the power manager performs datacenter inventory and network topology over network addresses to map server to the network topology and electrical hierarchy, at 408. The power manager can store the information in datastore 442.

In one example, the power manager rescans and performs a system inventory based on a time schedule. Thus, when a passes, the power manager can return to the rescan at 406 then to the mapping at 408. The time schedule can be every 24 hours or some other time that will permit the system to maintain system information, such as every 8 hours, 12 hours, 36 hours, or some other period. It will be understood that a relatively dynamic network can be scanned more frequently, and a more static network may not need to be scanned as frequently.

In one example, the power manager learns expected system behavior in the learning phase. The system can measure power data at multiple levels of the electrical hierarchy with sensors, at 410. In one example, the system measures power data at all levels of the electrical hierarchy. The power manager will gather the data in datastore 444, as consumed power information. In one example, the learning phase continues until a minimum threshold of data is collected, such as a full day or a number of days. If the minimum history is not collected, at 412 NO branch, the system continues to measure and store power consumption information.

When the minimum history is collected, at 412 YES branch, the power manager can perform computations on the data. In one example, the power manager parses the power data and matches/correlates the power data to the server inventory and electrical hierarchy information, at 414. It can be observed that the power manager can use the data from datastore 440, datastore 442, and datastore 444. In one example, the power manager can establish power levels based on server type. The power manager can establish maximum power consumed and average power consumed by server type based on the parsed power data, at 416.

After the setup and learning, the system can transition to operational, at 420. For the upside identification phase, the power manager can compute the upside and potential downside of adding server capacity. In one example, the power manager utilizes the consumed power from datastore 444 for upside identification. The power manager can store information back into the datastore based on determinations computed.

In one example, the power manager identifies representative unique systems/servers, applies power management control on a representative sample of servers, and remeasures the power consumption, at 422. The power management controls can include disabling turbo, setting a throttle limit, or other control. By applying changes to the operation of the system and remeasuring the power consumption, the power manager can learn how power management controls affect power consumption on an electrical path. The learning about how power management controls affect the power consumption can enable the power manager to determine the upside of adding more capacity based on the representative sample, at 424. Thus, the power manager can determine if additional capacity can be added with the hyperscale power control.

The determination of adding server capacity can be affected by multiple factors, including the upside, a high watermark (high level), and a low watermark (low level). In one example, the power manager calculates the upside as a minimum between (Peak Power with no controls minus Average Power with no controls) and (Peak Power with no controls minus Peak Power with capping), which can be expressed as: MIN[(PeakPower(no controls)−AvePower(no controls)), ((PeakPower(no controls)−(PeakPower(capping))]. The upside calculation can be a calculation of additional capacity.

The power manager can use the high watermark (high level) to determine when to apply power throttling at various levels compared to the maximum values. The power manager can use the low watermark (low level) to determine when to remove power throttling at various levels compared to the maximum values.

When the power manager computes an upside that indicates the ability to add capacity, the power manager can provide an indication to a system operator, which can then increase the server capacity accordingly. After more capacity is added to the system, the power manager can update the high level and low level to determine when to start to throttle and when to remove a throttle, respectively, at 426. The power manager can update the levels in datastore 446, which can represent storage for the upside, high level, and low level.

The system can enable hyperscale power control across an entire datacenter worth of servers, if the power manager was only working on a subset of the servers in the system. The power manager can treat the increase to the entire server system as adding more servers and update the upside, at 428. The computation of the update of the upside can access consumed power data from datastore 444. The power manager can store the data to datastore 446. The power manager can perform a power management assessment across the electrical hierarchy, at 430.

The power manager can determine if any of the measured values exceeds a high level or goes below a low level, at 432. The power manager can compute the determination based on the updated information in datastore 446. In one example, if the level is not crossed, at 434, where the level is higher than the low level and lower than the high level, the power manager can return to updating the levels to repeat the system monitoring, at 426.

In one example, if the low level is crossed, at 434, when the level is below (less than) the low level, the power manager can determine the maximum number of servers from which to remove power cap and apply the changes to selected servers, at 436. In one example, if the high level is crossed, at 434, when the level is above the high level, the power manager can determine the minimum number of servers to which to apply a power cap and apply the controls to the selected servers, at 438. After applying changes for crossing a low level, at 436, or a high level, at 438, the power manager can return to the system update to repeat the system monitoring, at 426.

Figure 5:
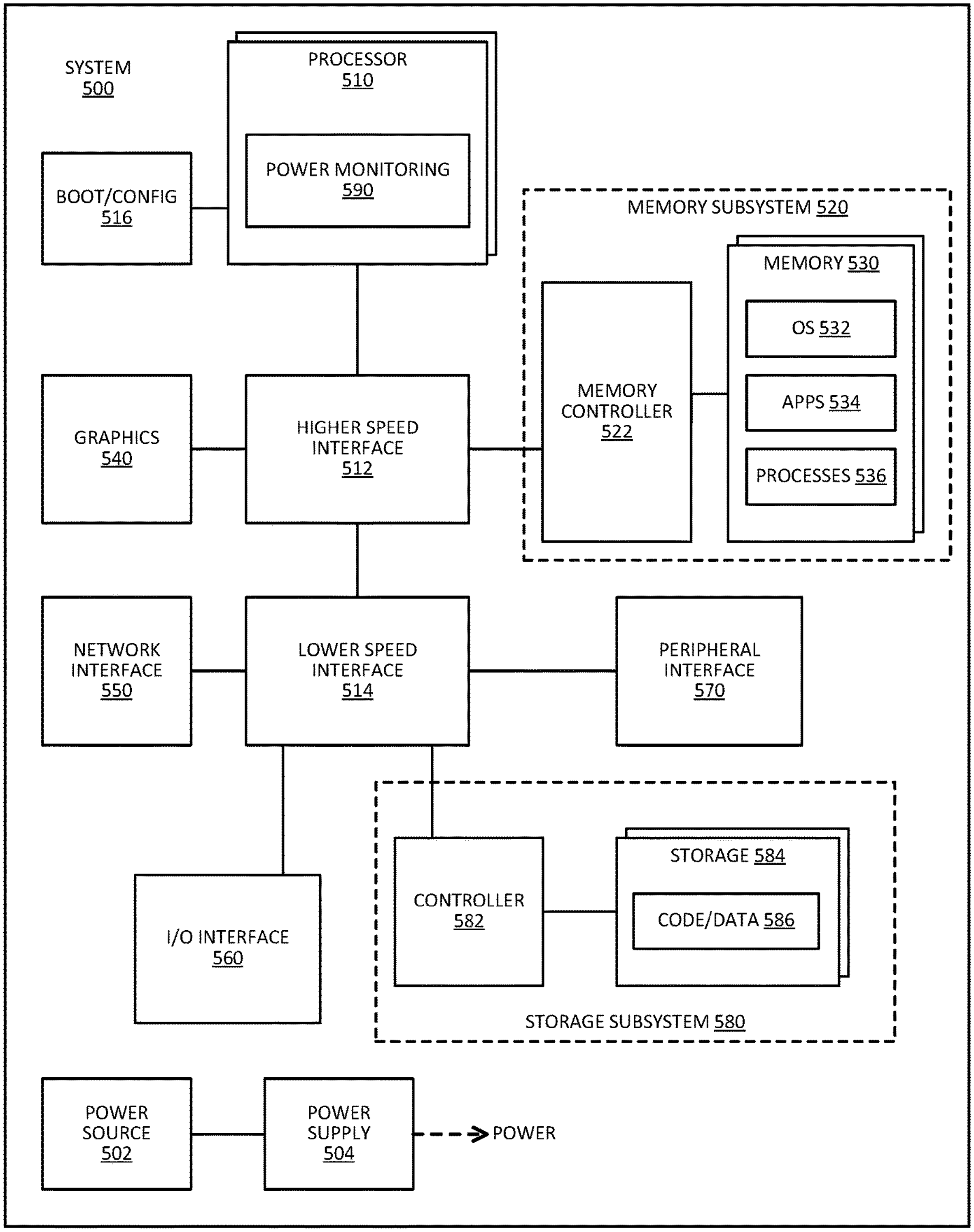
FIG. 5 is a block diagram of an example of a computing system in which power draw monitoring can be implemented.

FIG. 5 is a block diagram of an example of a computing system in which power draw monitoring can be implemented. System 500 represents a computing device in accordance with any example herein, and can be a server, a rack-based computing device, or an IPU.

In one example, system 500 includes power monitoring 590. System 500 can represent a server that implements a power manager for a system of servers (server system). Power monitoring 590 can represent any operation of a power manager in accordance with any example provided. With power monitoring 590, system 500 can provide hyper-scale power control to a system of servers, such as a datacenter. The hyperscale power control enables improved power management, enabling higher utilization of system infrastructure.

System 500 includes processor 510 can include any type of microprocessor, central processing unit (CPU), graphics processing unit (GPU), processing core, or other processing hardware, or a combination, to provide processing or execution of instructions for system 500. Processor 510 can be a host processor device. Processor 510 controls the overall operation of system 500, and can be or include, one or more programmable general-purpose or special-purpose microprocessors, digital signal processors (DSPs), programmable controllers, application specific integrated circuits (ASICs), programmable logic devices (PLDs), or a combination of such devices.

System 500 includes boot/config 516, which represents storage to store boot code (e.g., basic input/output system (BIOS)), configuration settings, security hardware (e.g., trusted platform module (TPM)), or other system level hardware that operates outside of a host OS. Boot/config 516 can include a nonvolatile storage device, such as read-only memory (ROM), flash memory, or other memory devices.

In one example, system 500 includes interface 512 coupled to processor 510, which can represent a higher speed interface or a high throughput interface for system components that need higher bandwidth connections, such as memory subsystem 520 or graphics interface components 540. Interface 512 represents an interface circuit, which can be a standalone component or integrated onto a processor die. Interface 512 can be integrated as a circuit onto the processor die or integrated as a component on a system on a chip. Where present, graphics interface 540 interfaces to graphics components for providing a visual display to a user of system 500. Graphics interface 540 can be a standalone component or integrated onto the processor die or system on a chip. In one example, graphics interface 540 can drive a high definition (HD) display or ultra high definition (UHD) display that provides an output to a user. In one example, the display can include a touchscreen display. In one example, graphics interface 540 generates a display based on data stored in memory 530 or based on operations executed by processor 510 or both.

Memory subsystem 520 represents the main memory of system 500 and provides storage for code to be executed by processor 510, or data values to be used in executing a routine. Memory subsystem 520 can include one or more varieties of random-access memory (RAM) such as DRAM, 3DXP (three-dimensional crosspoint), or other memory devices, or a combination of such devices. Memory 530 stores and hosts, among other things, operating system (OS) 532 to provide a software platform for execution of instructions in system 500. Additionally, applications 534 can execute on the software platform of OS 532 from memory 530. Applications 534 represent programs that have their own operational logic to perform execution of one or more functions. Processes 536 represent agents or routines that provide auxiliary functions to OS 532 or one or more applications 534 or a combination. OS 532, applications 534, and processes 536 provide software logic to provide functions for system 500. In one example, memory subsystem 520 includes memory controller 522, which is a memory controller to generate and issue commands to memory 530. It will be understood that memory controller 522 could be a physical part of processor 510 or a physical part of interface 512. For example, memory controller 522 can be an integrated memory controller, integrated onto a circuit with processor 510, such as integrated onto the processor die or a system on a chip.

While not specifically illustrated, it will be understood that system 500 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or other bus, or a combination.

In one example, system 500 includes interface 514, which can be coupled to interface 512. Interface 514 can be a lower speed interface than interface 512. In one example, interface 514 represents an interface circuit, which can include standalone components and integrated circuitry. In one example, multiple user interface components or peripheral components, or both, couple to interface 514. Network interface 550 provides system 500 the ability to communicate with remote devices (e.g., servers or other computing devices) over one or more networks. Network interface 550 can include an Ethernet adapter, wireless interconnection components, cellular network interconnection components, USB (universal serial bus), or other wired or wireless standards-based or proprietary interfaces. Network interface 550 can exchange data with a remote device, which can include sending data stored in memory or receiving data to be stored in memory.

In one example, system 500 includes one or more input/output (I/O) interface(s) 560. I/O interface 560 can include one or more interface components through which a user interacts with system 500 (e.g., audio, alphanumeric, tactile/touch, or other interfacing). Peripheral interface 570 can include any hardware interface not specifically mentioned above. Peripherals refer generally to devices that connect dependently to system 500. A dependent connection is one where system 500 provides the software platform or hardware platform or both on which operation executes, and with which a user interacts.

In one example, system 500 includes storage subsystem 580 to store data in a nonvolatile manner. In one example, in certain system implementations, at least certain components of storage 580 can overlap with components of memory subsystem 520. Storage subsystem 580 includes storage device(s) 584, which can be or include any conventional medium for storing large amounts of data in a non-volatile manner, such as one or more magnetic, solid state, NAND (persistent storage applying Not AND logic), three-dimensional crosspoint (3DXP), or optical based disks, or a combination. Storage 584 holds code or instructions and data 586 in a persistent state (i.e., the value is retained despite interruption of power to system 500). Storage 584 can be generically considered to be a "memory," although memory 530 is typically the executing or operating memory to provide instructions to processor 510. Whereas storage 584 is nonvolatile, memory 530 can include volatile memory (i.e., the value or state of the data is indeterminate if power is interrupted to system 500). In one example, storage subsystem 580 includes controller 582 to interface with storage 584. In one example controller 582 is a physical part of interface 514 or processor 510, or can include circuits or logic in both processor 510 and interface 514.

Power source 502 provides power to the components of system 500. More specifically, power source 502 typically interfaces to one or multiple power supplies 504 in system 500 to provide power to the components of system 500. In one example, power supply 504 includes an AC to DC (alternating current to direct current) adapter to plug into a wall outlet. Such AC power can be renewable energy (e.g., solar power) power source 502. In one example, power source 502 includes a DC power source, such as an external AC to DC converter. In one example, power source 502 or power supply 504 includes wireless charging hardware to charge via proximity to a charging field. In one example, power source 502 can include an internal battery or fuel cell source.

Figure 6:
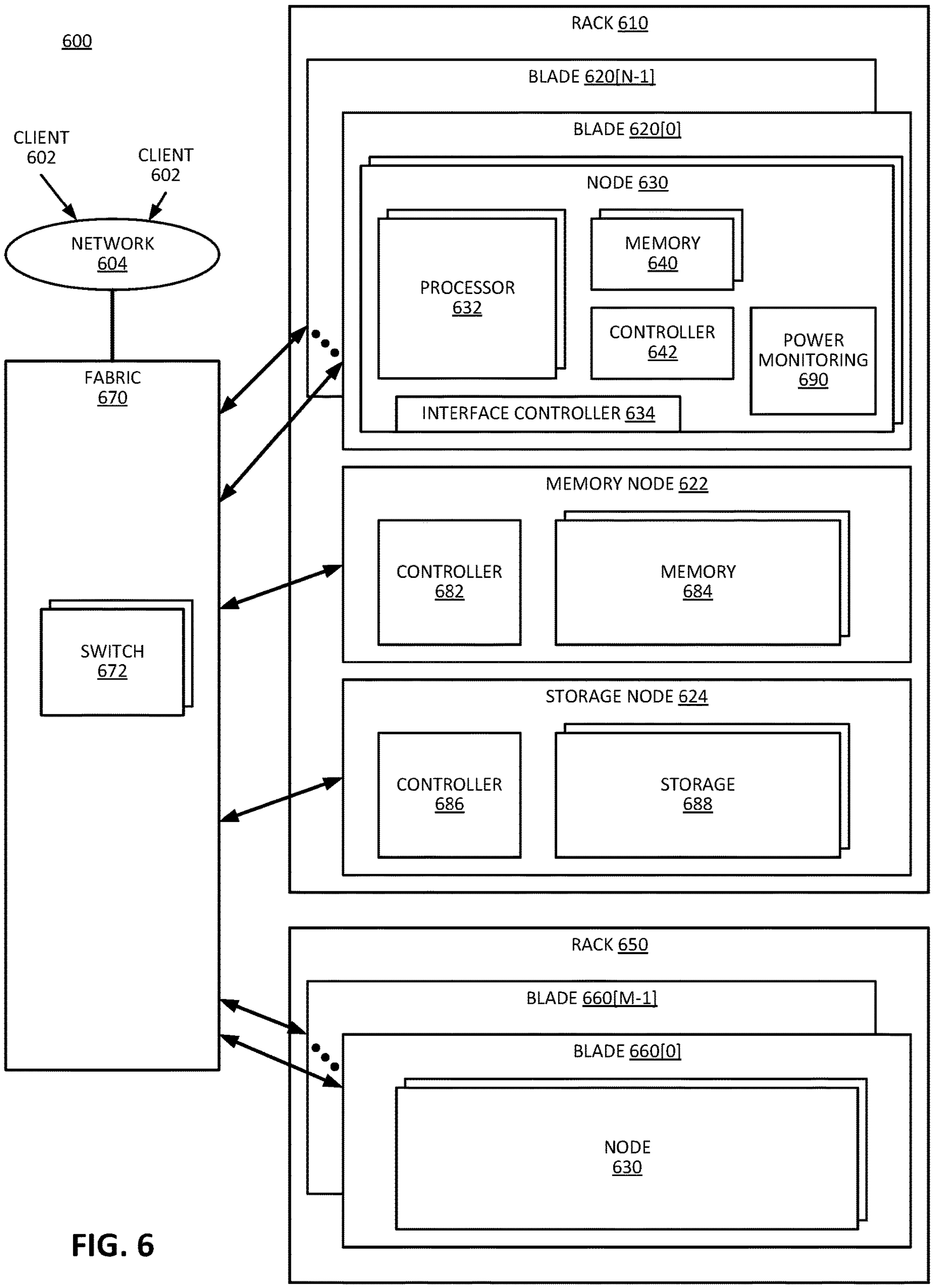
FIG. 6 is a block diagram of an example of a multi-node network in which power draw monitoring can be implemented.

FIG. 6 is a block diagram of an example of a multi-node network in which power draw monitoring can be implemented. System 600 represents a network of nodes. In one example, system 600 represents a data center. In one example, system 600 represents a server farm. In one example, system 600 represents a data cloud or a processing cloud.

Node 630 represents a computing device of blade 620[0] in system 600. In one example, node 630 includes power monitoring 690. System 600 can represent a system of servers, with node 630 being a server device that implements a power manager for the system. Power monitoring 690 can represent any operation of a power manager in accordance with any example provided. With power monitoring 690, system 600 can provide hyperscale power control to a system of servers, such as a datacenter. The hyperscale power control enables improved power management, enabling higher utilization of system infrastructure.

One or more clients 602 make requests over network 604 to system 600. Network 604 represents one or more local networks, or wide area networks, or a combination. Clients 602 can be human or machine clients, which generate requests for the execution of operations by system 600. System 600 executes applications or data computation tasks requested by clients 602.

In one example, system 600 includes one or more racks, which represent structural and interconnect resources to house and interconnect multiple computation nodes. In one example, rack 610 includes multiple nodes 630. In one example, rack 610 hosts multiple blade components 620. Hosting refers to providing power, structural or mechanical support, and interconnection. Blades 620 can refer to computing resources on printed circuit boards (PCBs), where a PCB houses the hardware components for one or more nodes 630. In one example, blades 620 do not include a chassis or housing or other "box" other than that provided by rack 610. In one example, blades 620 include housing with exposed connector to connect into rack 610. In one example, system 600 does not include rack 610, and each blade 620 includes a chassis or housing that can stack or otherwise reside in close proximity to other blades and allow interconnection of nodes 630.

System 600 includes fabric 670, which represents one or more interconnectors for nodes 630. In one example, fabric 670 includes multiple switches 672 or routers or other hardware to route signals among nodes 630. Additionally, fabric 670 can couple system 600 to network 604 for access by clients 602. In addition to routing equipment, fabric 670 can be considered to include the cables or ports or other hardware equipment to couple nodes 630 together. In one example, fabric 670 has one or more associated protocols to manage the routing of signals through system 600. In one example, the protocol or protocols is at least partly dependent on the hardware equipment used in system 600.

As illustrated, rack 610 includes N blades 620. In one example, in addition to rack 610, system 600 includes rack 650. As illustrated, rack 650 includes M blades 660. M is not necessarily the same as N; thus, it will be understood that various different hardware equipment components could be used, and coupled together into system 600 over fabric 670. Blades 660 can be the same or similar to blades 620. Nodes 630 can be any type of node and are not necessarily all the same type of node. System 600 is not limited to being homogenous, nor is it limited to not being homogenous.

For simplicity, only the node in blade 620[0] is illustrated in detail. However, other nodes in system 600 can be the same or similar. At least some nodes 630 are computation nodes, with processor (proc) 632 and memory 640. A computation node refers to a node with processing resources (e.g., one or more processors) that executes an operating system and can receive and process one or more tasks. In one example, at least some nodes 630 are server nodes with a server as processing resources represented by processor 632 and memory 640. A storage server refers to a node with more storage resources than a computation node, and rather than having processors for the execution of tasks, a storage server includes processing resources to manage access to the storage nodes within the storage server.

In one example, node 630 includes interface controller 634, which represents logic to control access by node 630 to fabric 670. The logic can include hardware resources to interconnect to the physical interconnection hardware. The logic can include software or firmware logic to manage the interconnection. In one example, interface controller 634 is or includes a host fabric interface, which can be a fabric interface in accordance with any example described herein.

Processor 632 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory 640 can be or include memory devices represented by memory 640 and a memory controller represented by controller 642.

In one example, rack 610 includes memory node 622 as a network node that stores data as network-attached system memory for multiple compute nodes (nodes 630). In one example, memory node 622 can provide memory for nodes of rack 610 as well as nodes of rack 650. In one example, rack 650 includes a memory node (not shown). Controller 682 represents a controller to manage access to memory 684 of memory node 622. Memory 684 can include volatile memory.

In one example, rack 610 includes storage node 624 as a network node that stores data as network-attached system memory for multiple compute nodes (nodes 630). In one example, storage node 624 can provide memory for nodes of rack 610 as well as nodes of rack 650. In one example, rack 650 includes a memory node (not shown). Controller 686 represents a controller to manage access to storage 688 of storage node 624. Storage 688 represents persistent memory that maintains state even if power is interrupted.

Example 1 is a system including: a bus segment of an electrical hierarchy; a first power distribution unit (PDU) coupled to the bus segment, the first PDU being one of multiple PDUs coupled to the bus segment; multiple server devices coupled to the first PDU, the server devices having a maximum power limit and a nominal power limit lower than the maximum power limit; and a power manager to monitor power draw of the bus segment, power draw of the multiple PDUs, and power draw of the multiple server devices, and based on the power draw, to permit one of the multiple server devices to draw more than the nominal power limit.

Example 2 is a system in accordance with Example 1, wherein the nominal power limit comprises a power threshold, wherein the power manager is to perform a power draw assessment in response to the one of the multiple server devices drawing power above the nominal power limit.

Example 3 is a system in accordance with any of Examples 1-2, wherein the first PDU has a maximum PDU power limit and a nominal PDU power limit lower than the maximum PDU power limit, wherein the power manager is to permit the first PDU to temporarily draw more than the nominal power unit power limit.

Example 4 is a system in accordance with any of Examples 1-3, wherein the power manager is to apply a power cap and remove a power cap on the one of the multiple servers based on the power draw.

Example 5 is a system in accordance with any of Examples 1-4, wherein the power manager is to permit the one of the multiple server devices to draw more than the nominal power limit based on a system power model, wherein the power manager is to train the system power model based on monitoring of power draw of the system.

Example 6 is a system in accordance with Example 5, wherein the power manager is to train the system power model based on monitoring of a representative subset of the multiple server devices, including to set permissible power draw levels for the multiple server devices.

Example 7 is a system in accordance with Example 6, wherein the power manager is to adjust the permissible power draw levels based on monitoring of behaviors of a larger subset of the multiple server devices.

Example 8 is an apparatus comprising a computer readable storage medium having content stored thereon, which when executed by a machine performs operations to execute a method including: monitoring power draw of an electrical hierarchy including a busbar power supply, multiple power units connected to the busbar power supply, and multiple server devices with power supply units (PSUs) connected to a first power unit of the multiple power units, the PSUs having a maximum power limit and a nominal power limit lower than the maximum power limit; and based on the power draw, permitting one PSU of the multiple server devices to draw more than the nominal power limit.

Example 9 is an apparatus in accordance with Example 8, wherein nominal power limit comprises a power threshold, wherein the method further includes: performing a power draw assessment in response to the one PSU drawing power above the nominal power limit.

Example 10 is an apparatus in accordance with any of Examples 8-9, wherein the first power unit has a maximum power unit power limit and a nominal power unit power limit lower than the maximum power unit power limit, wherein the method further includes: permitting the first power unit to temporarily draw more than the nominal power unit power limit.

Example 11 is an apparatus in accordance with any of Examples 8-10, wherein the method further includes: applying a power cap and remove a power cap on the one PSU based on the power draw.

Example 12 is an apparatus in accordance with any of Examples 8-11, wherein the method further includes: training a system power model based on monitoring power draw of the system; and permitting the one PSU to draw more than the nominal power limit based on the system power model.

Example 13 is an apparatus in accordance with Examples 12, wherein training the system power model comprises training based on monitoring a representative subset of the PSUs, including setting permissible power draw levels for the PSUs.

Example 14 is an apparatus in accordance with Examples 13, wherein the method further includes adjusting the permissible power draw levels based on monitoring behaviors of a larger subset of the PSUs.

Example 15 is a method including: monitoring power draw of an electrical hierarchy including a busbar power supply, multiple power units connected to the busbar power supply, and multiple server devices with power supply units (PSUs) connected to a first power unit of the multiple power units, the PSUs having a maximum power limit and a nominal power limit lower than the maximum power limit; and based on the power draw, permitting one PSU of the multiple server devices to draw more than the nominal power limit.

Example 16 is a method in accordance with Example 15, wherein nominal power limit comprises a power threshold, wherein the method further includes: performing a power draw assessment in response to the one PSU drawing power above the nominal power limit.

Example 17 is a method in accordance with any of Examples 15-16, wherein the first power unit has a maximum power unit power limit and a nominal power unit power limit lower than the maximum power unit power limit, wherein the method further includes: permitting the first power unit to temporarily draw more than the nominal power unit power limit.

Example 18 is a method in accordance with any of Examples 15-17, wherein the method further includes: applying a power cap and remove a power cap on the one PSU based on the power draw.

Example 19 is a method in accordance with any of Examples 15-18, wherein the method further includes: training a system power model based on monitoring power draw of the system; and permitting the one PSU to draw more than the nominal power limit based on the system power model.

Example 20 is a method in accordance with Example 19, wherein training the system power model comprises training based on monitoring a representative subset of the PSUs, including setting permissible power draw levels for the PSUs.

Example 21 is a method in accordance with Example 20, wherein the method further includes adjusting the permissible power draw levels based on monitoring behaviors of a larger subset of the PSUs.

Example 22 is a server device including: input/output (I/O) hardware coupled to receive input from sensors about power draw of different levels of an electrical hierarchy, the electrical hierarchy including a transformer level with a transformer, a bus segment level with multiple bus segments to couple to the transformer, a power distribution unit (PDU) level with multiple PDUs to couple to a first bus segment of the multiple bus segments, and a power supply unit (PSU) level with PSUs of multiple server devices to couple to a first PDU of the multiple PDUs; and a power manager to process power draw information from the sensors, compute a system topology, and determine whether to permit a first PSU of the PSUs to draw more power than the nominal power limit, based on power draw in the electrical hierarchy.

Example 23 is a server device in accordance with Example 22, wherein the power manager is to permit the one of the multiple server devices to temporarily draw more than the nominal power limit based on a system power model, wherein the power manager is to train the system power model based on monitoring of power draw of the system.

Example 24 is a server device in accordance with Example 23, wherein the power manager is to train the system power model based on monitoring of a representative subset of the multiple server devices, including to set permissible power draw levels for the multiple server devices.

Example 25 is a server device in accordance with any of Examples 22-24, wherein the power manager is to measure power data from the sensors for every level of the electrical hierarchy periodically to determine if power draw of any portion of the electrical hierarchy exceeds a high power level, and throttle at least one server of a portion of the electrical hierarchy in response a determination that the portion exceeds the high power level.

Example 26 is a server device in accordance with any of Examples 22-25, wherein the power manager is to measure power data from the sensors for every level of the electrical hierarchy periodically to determine if power draw of any portion of the electrical hierarchy is less than a low power level, and remove a throttle for at least one server of a portion of the electrical hierarchy in response a determination that the portion draws less than the low power level.

Example 27 is a server device in accordance with any of Examples 22-26, wherein the power manager is to measure power draw for a representative sample of server devices in the electrical hierarchy and compute whether additional server device capacity can be added to the electrical hierarchy based on power draw through the electrical hierarchy for the representative sample.

Example 28 is a system including: a bus segment of an electrical hierarchy; a first power distribution unit (PDU) coupled to the bus segment, the first PDU being one of multiple PDUs coupled to the bus segment; multiple server devices coupled to the first PDU, the server devices having a maximum power limit and a nominal power limit lower than the maximum power limit; and a control server device to execute a power manager to monitor power draw of the bus segment, power draw of the multiple PDUs, and power draw of the multiple server devices, and based on the power draw, to permit one of the multiple server devices to draw more than the nominal power limit.

Example 29 is a system in accordance with Example 28, wherein nominal power limit comprises a power threshold, wherein the power manager is to perform a power draw assessment in response to the one of the multiple server devices drawing power above the nominal power limit.

Example 30 is a system in accordance with any of Examples 28-29, wherein the first PDU has a maximum PDU power limit and a nominal PDU power limit lower than the maximum PDU power limit, wherein the power manager is to permit the first PDU to temporarily draw more than the nominal power unit power limit.

Example 31 is a system in accordance with any of Examples 28-30, wherein the power manager is to apply a power cap and remove a power cap on the one of the multiple servers based on the power draw.

Example 32 is a system in accordance with any of Examples 28-31, wherein the power manager is to permit the one of the multiple server devices to draw more than the nominal power limit based on a system power model, wherein the power manager is to train the system power model based on monitoring of power draw of the system.

Example 33 is a system in accordance with Example 32, wherein the power manager is to train the system power model based on monitoring of a representative subset of the multiple server devices, including to set permissible power draw levels for the multiple server devices.

Example 34 is a system in accordance with Example 33, wherein the power manager is to adjust the permissible power draw levels based on monitoring of behaviors of a larger subset of the multiple server devices.

Example 35 is a system in accordance with any of Examples 28-34, wherein the power manager is to permit the one of the multiple server devices to temporarily draw more than the nominal power limit based on a system power model, wherein the power manager is to train the system power model based on monitoring of power draw of the system.

Example 36 is a system in accordance with Example 35, wherein the power manager is to train the system power model based on monitoring of a representative subset of the multiple server devices, including to set permissible power draw levels for the multiple server devices.

Example 37 is a system in accordance with any of Examples 28-36, wherein the power manager is to measure power data from sensors for every level of the electrical hierarchy periodically to determine if power draw of any portion of the electrical hierarchy exceeds a high power level, and throttle at least one server of a portion of the electrical hierarchy in response a determination that the portion exceeds the high power level.

Example 38 is a system in accordance with any of Examples 28-37, wherein the power manager is to measure power data from sensors for every level of the electrical hierarchy periodically to determine if power draw of any portion of the electrical hierarchy is less than a low power level, and remove a throttle for at least one server of a portion of the electrical hierarchy in response a determination that the portion draws less than the low power level.

Example 39 is a system in accordance with any of Examples 28-38, wherein the power manager is to measure power draw for a representative sample of server devices in the electrical hierarchy and compute whether additional server device capacity can be added to the electrical hierarchy based on power draw through the electrical hierarchy for the representative sample.

Example 40 is a system including: an electrical hierarchy having multiple levels, including: a bus segment; a first power distribution unit (PDU) coupled to the bus segment, the first PDU being one of multiple PDUs coupled to the bus segment; multiple power supply units (PSUs) coupled to the first PDU, the PSUs to provide power to server devices having a maximum power limit and a nominal power limit lower than the maximum power limit; multiple sensors to generate power information about power draw of the multiple levels of the electrical hierarchy; and a power manager to process power draw information from the sensors, compute a system topology, and determine whether to permit one of the server devices to draw more than the nominal power limit.

Example 41 is a system in accordance with Example 40, wherein nominal power limit comprises a power threshold, wherein the power manager is to perform a power draw assessment in response to the one of the server devices drawing power above the nominal power limit.

Example 42 is a system in accordance with any of Examples 40-41, wherein the first PDU has a maximum PDU power limit and a nominal PDU power limit lower than the maximum PDU power limit, wherein the power manager is to permit the first PDU to temporarily draw more than the nominal power unit power limit.

Example 43 is a system in accordance with any of Examples 40-42, wherein the power manager is to apply a power cap and remove a power cap on the one of the server devices based on the power draw.

Example 44 is a system in accordance with any of Examples 40-43, wherein the power manager is to permit the one of the server devices to draw more than the nominal power limit based on a system power model, wherein the power manager is to train the system power model based on monitoring of power draw of the system.

Example 45 is a system in accordance with Example 44, wherein the power manager is to train the system power model based on monitoring of a representative subset of the server devices, including to set permissible power draw levels for the server devices.

Example 46 is a system in accordance with Example 45, wherein the power manager is to adjust the permissible power draw levels based on monitoring of behaviors of a larger subset of the server devices.

Example 47 is a system in accordance with any of Examples 40-46, wherein the power manager is to permit the one of the server devices to temporarily draw more than the nominal power limit based on a system power model, wherein the power manager is to train the system power model based on monitoring of power draw of the system.

Example 48 is a system in accordance with Example 47, wherein the power manager is to train the system power model based on monitoring of a representative subset of the server devices, including to set permissible power draw levels for the server devices.

Example 49 is a system in accordance with any of Examples 40-48, wherein the power manager is to measure power data from the sensors for every level of the electrical hierarchy periodically to determine if power draw of any portion of the electrical hierarchy exceeds a high power level, and throttle at least one server of a portion of the electrical hierarchy in response a determination that the portion exceeds the high power level.

Example 50 is a system in accordance with any of Examples 40-49, wherein the power manager is to measure power data from the sensors for every level of the electrical hierarchy periodically to determine if power draw of any portion of the electrical hierarchy is less than a low power level, and remove a throttle for at least one server of a portion of the electrical hierarchy in response a determination that the portion draws less than the low power level.

Example 51 is a system in accordance with any of Examples 40-50, wherein the power manager is to measure power draw for a representative sample of server devices in the electrical hierarchy and compute whether additional server device capacity can be added to the electrical hierarchy based on power draw through the electrical hierarchy for the representative sample.

Flow diagrams as illustrated herein provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:

1. A system including:
- an electrical hierarchy including:
  - multiple bus segments coupled to a transformer;
  - multiple power distribution units (PDUs) coupled to each bus segment; and
  - multiple server devices coupled to each PDU; and
- a power manager to monitor power draw through the electrical hierarchy to determine average power and peak power of the multiple server devices, and based on the average power and peak power of the multiple server devices, enable deployment of a number of server devices where the peak power exceeds a power limit of the transformer and the average power does not exceed the power limit of the transformer, and to manage operation of the multiple server devices to keep power draw of the electrical hierarchy within the power limit of the transformer.

2. The system of claim 1, wherein the multiple server devices have a nominal power limit, wherein the power manager is to perform a power draw assessment in response to one of the multiple server devices drawing power above the nominal power limit.

3. The system of claim 2, wherein the power manager is to apply a power cap to enforce the nominal power limit, and remove a power cap on one of the multiple server devices based on the power draw.

4. The system of claim 2, wherein the power manager is to enable one of the multiple server devices to draw more than the nominal power limit based on a system power model, wherein the power manager is to train the system power model based on the monitoring of the power draw of the electrical hierarchy.

5. The system of claim 4, wherein the power manager is to train the system power model based on monitoring of a representative subset of the multiple server devices, including to set permissible power draw levels for the multiple server devices.

6. The system of claim 5, wherein the power manager is to adjust the permissible power draw levels based on monitoring of behaviors of a larger subset of the multiple server devices.

7. The system of claim 1, wherein the multiple PDUs have a maximum PDU power limit and a nominal PDU power limit lower than the maximum PDU power limit, wherein the power manager is to enable one of the multiple PDUs to temporarily draw more than the nominal PDU power limit.

8. An apparatus comprising a computer readable storage medium having content stored thereon, which when executed by a machine performs operations to execute a method including:

monitoring power draw of an electrical hierarchy having multiple bus segments coupled to a transformer, multiple power distribution units (PDUs) coupled to each bus segment, and multiple server devices coupled to each PDU, the monitoring to determine average power and peak power of the multiple server devices;

based on the average power and peak power for the multiple server devices, enabling deployment of a number of server devices where the peak power exceeds a power limit of the transformer and the average power does not exceed the power limit of the transformer; and managing operation of the multiple server devices to keep power draw of the electrical hierarchy within the power limit of the transformer.

9. The apparatus of claim 8, wherein the multiple server devices have a nominal power limit, wherein the method further includes:

performing a power draw assessment in response to one of the multiple server devices drawing power above the nominal power limit.

10. The apparatus of claim 9, wherein the method further includes:

applying a power cap to enforce the nominal power limit, and remove a power cap on one of the multiple server devices based on the power draw.

11. The apparatus of claim 9, wherein the method further includes:

training a power model for a system based on the monitoring the power draw of the electrical hierarchy; and enabling one of the multiple server devices to draw more than the nominal power limit based on the power model for the system.

12. The apparatus of claim 11, wherein training the power model for the system comprises training based on monitoring a representative subset of the multiple server devices, including setting permissible power draw levels for the multiple server devices.

13. The apparatus of claim 12, wherein the method further includes adjusting the permissible power draw levels based on monitoring behaviors of a larger subset of the multiple server devices.

14. The apparatus of claim 8, wherein the multiple PDUs have a maximum PDU power limit and a nominal PDU power limit lower than the maximum PDU power limit, wherein the method further includes:

enabling one of the multiple PDUs to temporarily draw more than the nominal PDU power limit.

15. A server device, comprising:

input/output (I/O) hardware coupled to receive input from sensors about power draw of different levels of an electrical hierarchy, the electrical hierarchy including a transformer level with a transformer, a bus segment level with multiple bus segments to couple to the transformer, a power distribution unit (PDU) level with multiple PDUs to couple to each of the multiple bus segments, and a power supply unit (PSU) level with PSUs of multiple server devices to couple to each of the multiple PDUs; and a power manager to process information from the sensors about the power draw to determine average power and peak power of the PSUs, compute a system topology, and based on the average power and peak power for the multiple server devices, enable deployment of a number of server devices where the peak power exceeds a power limit of the transformer and the average power does not exceed the power limit of the transformer, and to manage operation of the multiple server devices to keep power draw of the electrical hierarchy within the power limit of the transformer.

16. The server device of claim 15, wherein the multiple server devices have a nominal power limit, wherein the power manager is to enable one of the multiple server devices to temporarily draw more than the nominal power limit based on a power model for the system, wherein the power manager is to train the power model for the system based on monitoring of the power draw of the electrical hierarchy.

17. The server device of claim 16, wherein the power manager is to train the system power model based on monitoring of a representative subset of the multiple server devices, including to set permissible power draw levels for the multiple server devices.

18. The server device of claim 15, wherein the power manager is to measure power data from the sensors for every level of the electrical hierarchy periodically to determine if power draw of any portion of the electrical hierarchy exceeds a high power level, and throttle at least one server of a portion of the electrical hierarchy in response a determination that the portion exceeds the high power level.

19. The server device of claim 15, wherein the power manager is to measure power data from the sensors for every level of the electrical hierarchy periodically to determine if power draw of any portion of the electrical hierarchy is less than a low power level, and remove a throttle for at least one server of a portion of the electrical hierarchy in response a determination that the portion draws less than the low power level.

* * * * *